United States Patent [19]

Robinson et al.

[11] Patent Number: 4,986,217
[45] Date of Patent: Jan. 22, 1991

[54] DISPOSABLE CAT LITTER BOX

[75] Inventors: Robert Robinson; Ernest O. Hartman, both of Chicago, Ill.

[73] Assignee: Robinson Hartman, Chicago, Ill.

[21] Appl. No.: 407,934

[22] Filed: Sep. 15, 1989

[51] Int. Cl.$^5$ .............................................. A01K 29/00
[52] U.S. Cl. .................................. 119/168; 229/117.02
[58] Field of Search ................. 119/1; 229/101, 117.02

[56] References Cited

U.S. PATENT DOCUMENTS

| 657,197 | 9/1900 | Hills | 229/117.02 |
|---|---|---|---|
| 3,148,821 | 9/1964 | Gardiner | 229/101 |
| 3,291,372 | 12/1966 | Saidel | 229/101 |
| 3,438,562 | 4/1969 | Connor et al. | 229/117.02 |
| 3,886,901 | 6/1975 | Zeitter | 119/1 |
| 4,014,292 | 3/1977 | Coughlin et al. | 119/1 |
| 4,101,052 | 7/1978 | Dove | 229/117.02 |
| 4,164,314 | 8/1979 | Edgar | 119/1 |
| 4,171,680 | 10/1979 | Silver et al. | 119/1 |
| 4,272,009 | 6/1981 | Bamburg et al. | 229/117.02 |
| 4,305,544 | 12/1981 | Noonan | 119/1 |
| 4,348,982 | 9/1982 | Selby | 119/1 |
| 4,441,451 | 4/1984 | Neal | 119/1 |
| 4,501,226 | 2/1985 | Bienvenu et al. | 119/1 |
| 4,541,360 | 9/1985 | Higgins et al. | 119/1 |
| 4,548,160 | 10/1985 | Feitelson | 119/1 |
| 4,624,380 | 11/1986 | Wernette | 119/1 |
| 4,628,863 | 12/1986 | Eichenauer | 119/1 |
| 4,711,198 | 12/1987 | Mossbarger | 119/1 |
| 4,732,111 | 3/1988 | Runion | 119/1 |
| 4,736,707 | 4/1988 | Christie | 119/1 |
| 4,776,300 | 10/1988 | Braddock | 119/1 |
| 4,779,566 | 10/1988 | Morris et al. | . |
| 4,782,788 | 11/1988 | Arcand | 119/1 |
| 4,788,935 | 12/1988 | Bella et al. | 119/1 |
| 4,791,883 | 12/1988 | Lehman et al. | . |
| 4,792,082 | 12/1988 | Williamson | . |
| 4,846,105 | 7/1989 | Caldwell | 119/1 |

Primary Examiner—John Weiss
Attorney, Agent, or Firm—Nixon & Vanderhye

[57] ABSTRACT

A disposable cat litter box includes a bottom portion for carrying litter material and formed with a relatively rigid lower portion having a bottom wall, a pair of upstanding side walls and a pair of upstanding end walls, and a foldable upper portion including a flap portion foldable between collapsed and extended positions attached to each of the side walls and end walls. A removable, relatively rigid lid dimensioned to fit on the bottom portion with the flap portions in either the collapsed or extended positions is also provided. Both the box bottom and removable lid are constructed from standard box blanks modified to include an entry/exit opening, a finger pull to facilitate gripping one of the flap portions, and a pair of gripping cut-outs in the lid.

24 Claims, 2 Drawing Sheets

DISPOSABLE CAT LITTER BOX

BACKGROUND AND SUMMARY OF THE INVENTION

The present invention relates to disposable cat litter boxes and, particularly, to a simplified construction for such boxes which enables the box to be formed with conventional box blanks and with conventional box making equipment.

In the past, disposable cat litter boxes have been produced in various configurations, each requiring special tooling designed for the particular box configuration. Examples of such constructions are found in U.S. Pat. Nos. 4,792,082; 4,788,935; 4,782,788; 4,776,300; 4,711,198; 4,441,451; 4,548,160; 4,541,360; 4,501,226; 4,348,982; 4,305,544; 4,164,314; 4,014,292; and 3,886,901.

It is also known in the disposable cat litter box field to provide boxes which are collapsible from configurations, as evidenced by several of the above cited patents. In other words, it is known to provide a disposable cat litter box which contains fresh litter and which is supplied in a collapsed (or low profile) configuration, and which is expandable to an "in use" or operative configuration. The box may then be collapsed after use to its original configuration and disposed of as appropriate, so that the pet owner need not come into contact with the litter material and animal waste.

None of these boxes, however, provide the benefits of simplicity and low cost to the extent realized by the present invention.

It is therefore the principal objective of this invention to provide a simplified, low-cost, collapsible and disposable cat litter box, utilizing standard box blanks and box forming equipment.

In one exemplary embodiment of the invention, a cat litter box is provided which comprises a box bottom and removable lid which is adapted to fit telescopically over the box bottom. The box bottom is formed with relatively rigid side and end walls and a relatively rigid bottom wall. Extending from each side wall and end wall is a flap portion foldable between a substantially upright positions where the latter effectively forms an extension of the respective side or end wall, and a collapsed position where the flap portion extends substantially horizontally, i.e., perpendicular to the respective side or end walls. Collectively, the flap portions enable the box to be transformed from a relatively flat or "low profile" box, to a volumetrically expanded box of a size sufficient to permit entry and exit of small to medium size pets such as cats. More specifically, the flap portions are dimensioned to increase the height of the box of a factor of about four. To facilitate entry and exit by a pet such as a cat, a die cut opening is provided in one of the end walls.

One end wall flap portion is provided with a die-cut opening to allow ingress and egress of the cat, and a side wall flap portion is provided with a finger pull tab which facilitates unfolding of the side wall flap portion.

A single-piece blank (preferably corrugated cardboard) of standardized construction, but adjusted to achieve the desired side wall and end wall dimensions, is employed to form the box bottom.

The removable, full telescopic lid is similar to the lower box bottom, absent the flap portions. Thus, the removable lid is also provided with relatively rigid side walls, end walls and top wall, with the side and end walls depending from the periphery of the top wall in a conventional manner. In accordance with this invention, the removable lid is designed for use with the box in both the collapsed and expanded configurations. Here again, a single conventional blank is employed in the construction of the removable lid.

In an exemplary embodiment, the side and end walls of the removable lid are sized so that, in the collapsed position, both the removable lid and the box bottom will rest on the floor or other supporting surface, thereby creating a double column effect for stacking strength.

Thus, in accordance with one aspect of the invention, the disposable cat litter box comprises a bottom portion for carrying litter material including a relatively rigid lower portion having a bottom wall, a pair of upstanding side walls and a pair of upstanding end walls; and a foldable upper portion including a flap portion foldable between collapsed and extended positions attached to each of the side walls and end walls; and a removable, relatively rigid lid dimensioned to fit on the box with the flap portions in either said collapsed or extended positions.

In another aspect, the present invention is directed to a two-piece cat litter box comprising a box bottom lower portion including a first pair of relatively rigid side walls, a first pair of relatively rigid end walls and a bottom wall, and a box bottom upper portion comprising foldable flap portions integrally hinged to each of the pair of relatively rigid side walls and the pair of relatively rigid end walls; the box bottom formed from a single elongated blank having a first set of three parallel lines defining four panels, each of which forms one of the two pair of end walls and side walls, one of the foldable flap portions, and a portion of the bottom wall, and wherein one of the foldable flap portions is provided with a die cut opening for permitting a cat to enter and exit the box.

It will be appreciated that the box construction of this invention may be used for other purposes as well. Thus, in accordance with still another aspect of the invention, there is provided a box construction comprising a bottom portion including a relatively rigid lower portion having a bottom wall, a pair of upstanding side walls and a pair of upstanding end walls; and a foldable upper portion including a flap portion foldable between collapsed and extended positions attached to each of the side walls and end walls; and a removable, relatively rigid lid dimensioned to fit on the bottom portion with the flap portions in either the collapsed or extended positions.

It will be appreciated that the box of this invention has several advantages in each of its production, distribution and end use stages. For example, the standard box bottom has no restricted openings, making it easy to fill with litter or other material. The box is easily closed up without the need for any specially designed equipment, assuming its low profile configuration for ease of shipment, storage and merchandising. Once the box has been purchased, the box is easily re-configured to its end-use or functional configuration, and easily collapsed after use for disposal. It is significant that during the end use stage, the user has only minimal exposure to the litter or other material and need not, at any time, come into direct contact with such material.

Other objects and advantages of the invention will become apparent from the detailed description which follows.

DETAILED DESCRIPTION OF THE DRAWINGS

Figure 1:
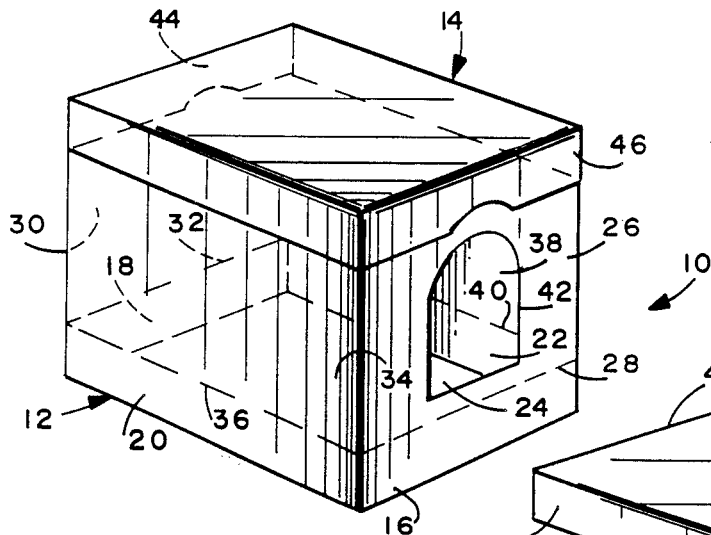
FIG. 1 is a perspective view of a disposable kitty litter box in an expanded or "in use" configuration in accordance with the invention.

Referring now to the drawings, and especially to FIGS. 1-5, the disposable litter box 10 is constructed essentially of an expandable box including a relatively rigid bottom or litter containing portion 12 and a relatively rigid removable lid 14. The box is preferably constructed of corrugated cardboard but other suitable material may also be employed.

The bottom portion 12 of the box 10 is formed from a single blank and includes a pair of upstanding end walls 16, 18 and a pair of upstanding side walls 20, 22 and a bottom wall 24. Flap portions are provided at an upper end of each of the sidewalls and end walls, and are foldable about horizontally aligned fold or hinge lines. Thus, end wall 16 is provided with a flap 26 foldable about a fold line 28; end wall 18 is provided with a flap 30 foldable about a fold line 32; side wall 20 is provided with a flap 34 foldable about a fold line 36; and side wall 22 is provided with a flap 38 foldable about a fold line 40. Fold lines 28, 32, 36 and 40 are substantially horizontally aligned, i.e., they lie substantially within a horizontal plane which is parallel to the bottom wall 24 and perpendicular to the end walls 16, 18, and side walls 20 and 22. As will be explained further herein, bottom wall 24 is formed from additional flap portions integrally formed with the side walls 16, 18 and end walls 20, 22 and extending from and foldable about fold lines 28', 32', 36' and 40' (see FIGS. 5 and 6).

As will also be explained below, the flap portions 26, 30, 34 and 38 are foldable between substantially vertical positions as shown in FIG. 1, to substantially horizontal, collapsed positions shown in FIG. 3.

Flap portions 34 and 38 are substantially identical to each other and each substantially overlies the entire bottom wall 24 when it is folded inwardly and downwardly to the collapsed position.

Figure 3:
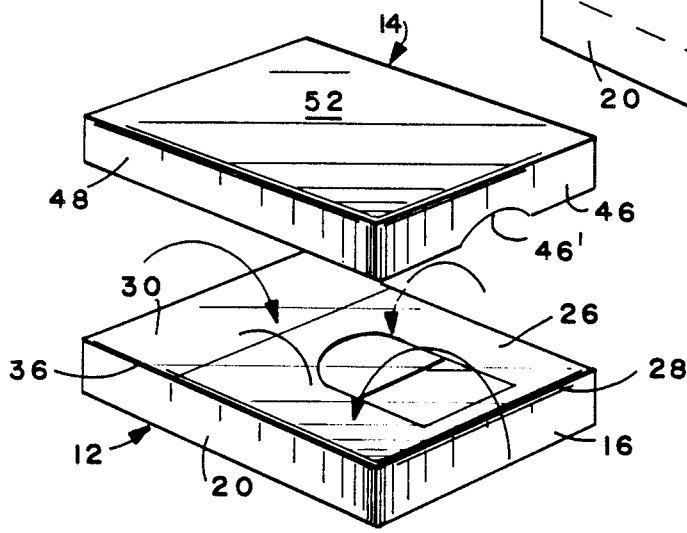
FIG. 3 is a perspective view as shown in FIG. 1 but with the lid removed and sidewalls and end walls collapsed.

End wall flap portions 26 and 30 are also substantially identical to each other, but extend only partially (about ¾ of the distance) toward the opposite end walls 18, 16, respectively, also best seen in FIG. 3. End wall flap portion 26 is provided with a die cut or opening 42 which is large enough to allow a cat to enter and leave the box.

As will be appreciated from FIGS. 1 through 4, the flap portions serve to increase the height of the box when in their upright positions by a factor of about four, thereby effecting a substantial volumetric expansion of the box. This arrangement therefor provides a very compact and low profile construction for both supply and disposal purposes.

The removable lid 14 has a pair of relatively rigid downwardly extending end walls 44, 46 and a pair of relatively rigid, downwardly extending side walls 48, 50, all of which depend from a substantially flat top wall 52.

Figure 4:
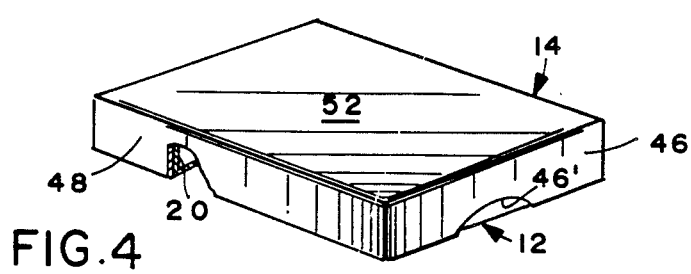
FIG. 4 is a perspective view of the kitty litter box in accordance with the invention, shown in a collapsed configuration.

The end walls 44, 46 and side walls 48, 50 have a uniform height substantially equal to the side walls 20, 22 and end walls 16, 18 so that the free edges of end walls 44, 46 and side walls 48, 50 engage a floor or other supporting surface (along with the box bottom) when the removable lid is applied to the box bottom in the collapsed position, as best seen in FIG. 4. This arrangement creates a double column effect which substantially increases the strength of the collapsed box. This is particularly important in permitting vertical stacking of the boxes during storage and/or shipment and mass merchandising with eight to ten pounds of litter material contained therein.

In a related aspect of the invention, gripping cut-outs 44' and 46' may be formed in the lid end walls 44, 46, respectively, to facilitate removal of the lid, particularly when the flap portions are in the collapsed position.

With reference now to FIGS. 3 and 4, the flap portions 26, 30, 34 and 38 are foldable to a substantially horizontal position, and lid 14 may be placed on the lower box portion 12 to form a cat litter box in a collapsed state, as shown in FIG. 4. In a preferred embodiment of the invention, the flap portions are folded in the sequence 38, 34, 30 and 26. Since flap portions 38 and 34 have dimensions substantially identical to the bottom wall 24, the first folded flap portion 38 will engage the opposite side wall 20 and end walls 16 and 18 to create a "seal" to thereby prevent the escape of litter material from the lower box portion 12. This seal is, of course, augmented by the remaining flap portions 26, 30 and 34 when the latter are folded to their horizontal or collapsed position.

In order to lift the flap portion 38 to its extended position, a finger pull 39 is formed integrally with the flap 38 by die-cutting the finger pull area within the flap. The pull 39 is designed to be partially punched out by the user, permitting insertion of the finger within the resulting aperture to thereby facilitate obtaining a grip on the flap.

It will be understood that the flap portion 34 may be spaced slightly away from the side wall 22 in the collapsed position to facilitate unfolding. However, no litter will escape since the flap portion 34 overlies the "sealing" flap portion 38.

Figure 2:
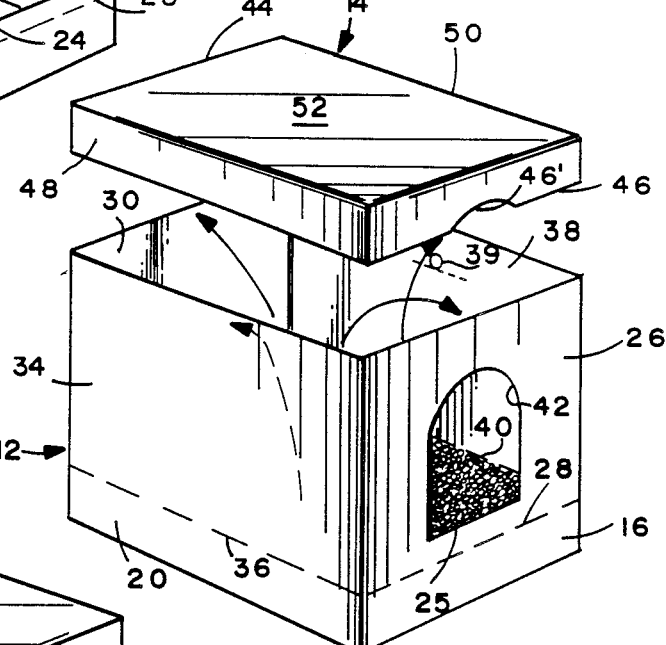
FIG. 2 is a perspective view as illustrated in FIG. 1 but with the lid removed.

Referring now to FIGS. 1 to 3 in reverse order, it will be seen that lid 14 may be removed, and flaps 26, 30, 34 and 38 folded upwardly to a substantially vertical state so that the lid 14 can be re-applied as shown in FIG. 2, to complete the formation of the expanded cat litter box shown in FIG. 1.

It will be appreciated that the disposable cat litter box in accordance with this invention will be supplied in the configuration shown in FIG. 4, but with about eight to ten pounds of fresh litter material 25 contained within the lower portion 12. The litter material has been omitted from FIG. 4 but is shown at 25 in FIG. 2. It will further be appreciated that the enclosure defined by end walls 16, 18, side walls 20, 22 and bottom wall 24 are treated to make them liquid-resistant by any suitable means, the treatment to be effective through at least the projected functional life of the box. After use, the lid may be removed, the box collapsed to the configuration illustrated in FIG. 1, the lid replaced, and the entire assembly disposed of with the used litter material and the animal waste remaining in the box.

Alternatively, the box may be collapsed to the configuration shown in FIG. 4 without removing the lid. This is accomplished by pushing the side wall flap portions 30, 38 inwardly, and then folding the end wall flap portions 26, 30 inwardly, with the lid 14 guided into position over the lower box portion.

In still another manner of collapsing the box after use, one or both of the side wall flaps 30, 38 can be pushed inwardly to their fully horizontal or collapsed positions, the lid removed, end walls 26, 30 collapsed, and the lid replaced over the lower box portion.

The latter two collapsing techniques have the advantage of allowing the user to dispose of the box without having to come into contact, or even see, the used litter.

It is an important feature of the present invention that both the bottom and lid portions of the box may be formed from standard cardboard blanks conventionally used to form boxes. In other words, with the exception of the cut-outs 42, 44', 46' and finger pull 39, the box in accordance with this invention may be made on conventional erect-form-fill seal corrugated box packaging equipment or machines, with adjustments for the dimensions of each portion. The folding, gluing, and fold line forming operations may be carried out also using conventional equipment. This commonality of design provides great economies in the production of boxes as disclosed herein.

Figure 6:
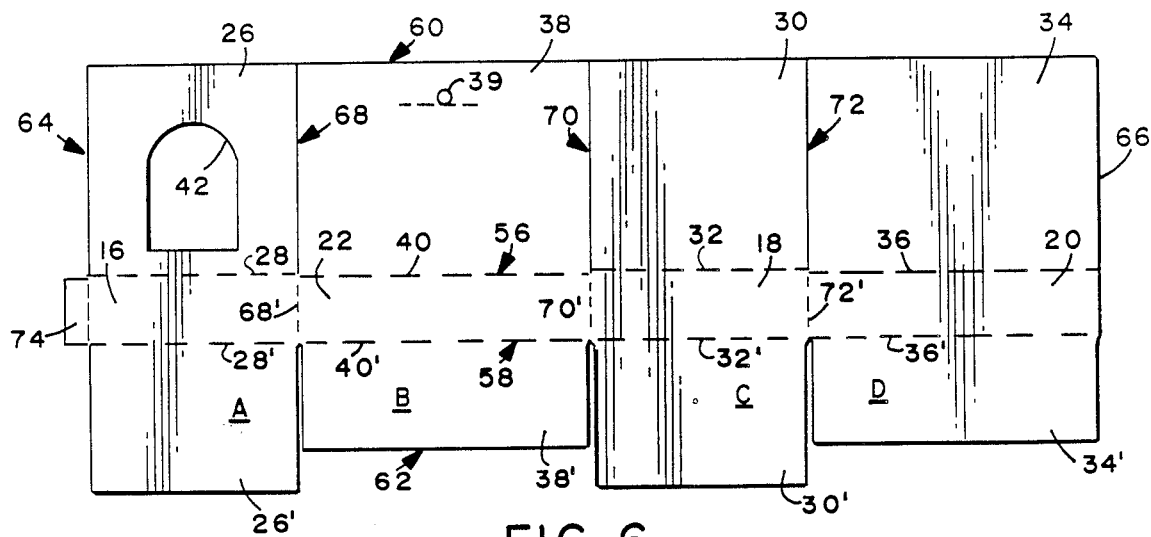
FIG. 6 is a plan view of a blank used to construct the bottom portion of the kitty litter box.
Figure 7:
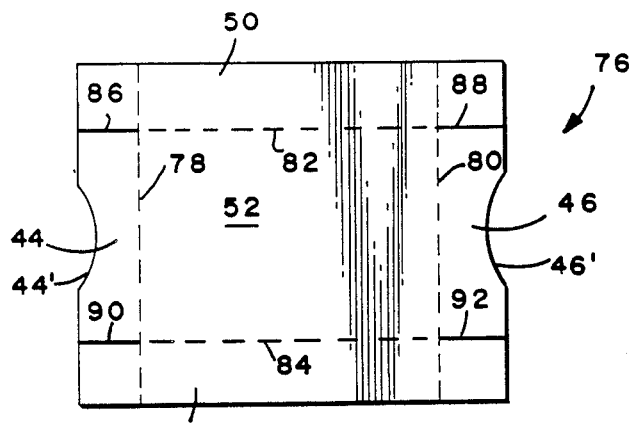
FIG. 7 is a plan view of a blank used to construct the lid portion of the kitty litter box.

Referring now to FIGS. 6 and 7, standard cardboard blanks 54 and 56 are illustrated which may be used to form the box bottom 12 and removable lid 14, respectively.

Figure 5:
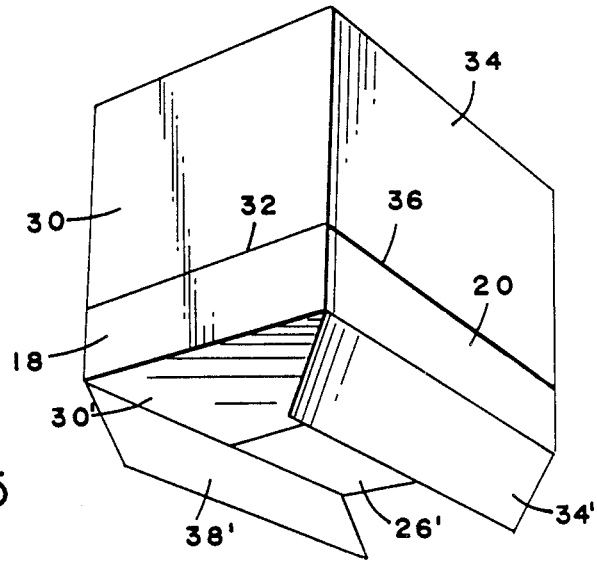
FIG. 5 is a perspective view of the box shown in FIG. 1, with the lid removed and showing the bottom wall construction.

The blank 54, known in the trade as a Center Special Slotted Container, is divided by fold lines and combination slit/notched lines as shown in FIG. 6. Specifically, a pair of fold lines 56, 58 are formed (by scoring, creasing or any other suitable means) in the lengthwise or horizontal direction of the blank, intermediate top and bottom edges 60, 62 and extending from one side edge 64 to the other 66. The upper fold line 56 forms the previously described, and axially aligned fold lines 28, 40, 32 and 36. The lower fold line 58 forms the previously described fold lines 28', 40', 32' and 36'. As best seen in FIG. 5, fold lines 28 and 32 are vertically offset from fold lines 36 and 40 by an amount substantially equal to the thickness of the board material so as to permit the end wall flap portions 26, 30 to lie flat over the side wall flap portions 34, 38 in the folded or collapsed position.

At the same time, the blank 54 is divided in the vertical direction into four panels by three vertically extending, parallel lines 68, 70 and 72. Each of these lines comprises three distinct portions: an upper slit portion 69, 71 and 73, respectively above the fold line 56; a fold portion 69', 71' and 73', respectively, between fold lines 56, 58, and a lower notched portion 69", 71" and 73" below the fold line 58. In standard box constructions, the upper portions of lines 68, 70 and 72 would also be notched (by an amount approximately equal to the board thickness) to provide a tolerance which permits easy folding of the flap portions without interference from adjacent flap portions. In the presently preferred construction, however, the upper portions of lines 68, 70 and 72 are merely slit. This omission of any tolerance results in a "friction lock" between the flap portions when they are raised to the upright position. As a result, no tabs or other locking arrangement is required to maintain the flap portions in their respective upright positions.

Each panel thereby defines an upper flap and a lower flap extending in opposite directions from fold lines 56, 58. It will be understood that the area between fold lines 56, 58 comprises side and end walls 16, 22, 18 and 20. For example, a first panel A defined by portions of top and bottom edges 60, 62, respectively, side edge 64 and line 68, will eventually form upper flap 26, end wall 16 and a lower flap 26'. Similarly, a second panel B defined by portions of top and bottom edges 60, 62 respectively, and lines 68, 70 will eventually form the upper flap 38, side wall 22 and a lower flap 38'. Panel C is defined by portions of top and bottom edges 60, 62, respectively, and lines 70 and 72. This panel will eventually form upper flap 30, end wall 18 and lower flap 30'. Finally, panel D, defined by portions of top and bottom edges 60, 62, respectively, line 72 and edge 66 will eventually form upper flap 34, side wall 20 and lower flap 34'.

The lower edge 62 of the blank is formed irregularly to provide lower flap portions 26' and 30' with first identical dimensions (corresponding to the full width and one half the length of the finished box), and lower flap portions 38', 34' with second identical dimensions (corresponding to the full length and one half the width of the box), so that when folded and glued, the lower flap portions form an essentially double thickness bottom wall 24.

An extended tab portion 74 projects outwardly from side edge 64 and an alignment with fold lines 56, 58 to provide a tab which facilitates gluing at the box converting operation. In a preferred embodiment, the box blank is folded in half along line 70, and tab 74 is glued to side wall 20 at the converter station, and thereafter shipped flat (i.e., in double thickness) to the packager.

The die cut opening 42 and finger pull 39 are preferably die-cut in the upper flap 26 of panel A and upper flap 38 of panel B, respectively, of the blank prior to folding and gluing.

With the exception of the die cut entry or opening 42, finger pull 39 and slit lines above the fold line 56, the above described blank has a standard configuration typically utilized in the construction of boxes, with desired adjustment of panel portion widths and lengths. The manner in which the blank is folded and glued to form the box shown in FIGS. 1-4 is wholly conventional and need not be described in detail.

The blank 76 which forms the removable lid 14 is formed by a pair of vertically extending fold lines 78, 80 and a pair of substantially horizontal fold lines 82, 84. Extensions of lines 82, 84 beyond the fold lines 78, 80 are notched as shown at 86, 88 and 90, 92, respectively, to permit the folding and gluing operations necessary to form the removable lid as shown in FIG. 2.

Here again, with the exception of cut-outs 44' and 46', the lid configuration is entirely of conventional construction.

It will be appreciated that the blank 76 will be folded and glued in a conventional manner to form the previously described side walls 48, 50, end walls 44, 46 and top wall 52.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A disposable cat litter box comprising a bottom portion for carrying litter material including a relatively rigid lower portion having a bottom wall, a pair of upstanding side walls and a pair of upstanding end walls; and a foldable upper portion including a flap portion foldable between collapsed and extended positions attached to each of said side walls and end walls; and a removable, relatively rigid lid dimensioned to fit on said bottom portion with said flap portions in either said collapsed or extended portions, wherein, in the extended position, vertical edges of each flap portion lie substantially perpendicular to vertical edges of adjacent flap portions, and further wherein each pair of adjacent edges are created from a single cut in said upper portion such that, in use, a friction lock is established between said adjacent edges when said foldable flap portions are raised to said extended position.

2. A disposable cat litter box as defined in claim 1 wherein each of said flap portions is integrally hinged to a corresponding one of said side walls and end walls.

3. A disposable cat litter box as defined in claim 1 wherein one of said flap portions is provided with an entry opening.

4. A disposable cat litter box as defined in claim 1 wherein said relatively rigid portion is interiorly treated to be liquid resistant for a period of time corresponding at least to the functional life of the box.

5. A disposable cat litter box as defined in claim 1 wherein said removable lid is dimensioned to lie over and substantially completely enclose said relatively rigid lower portion in telescoping relationship, when said flap portions are in the collapsed position, such that the removable lid will engage a supporting surface underlying the box.

6. A disposable cat litter box as defined in claim 1 wherein said bottom portion and said removable lid are formed from standard cardboard box blanks.

7. A disposable cat litter box as defined in claim 1 wherein each of said flap portions is integrally hinged to a corresponding one of said side walls and end walls and wherein one of said flap portions is provided with an entry opening.

8. A disposable cat litter box as defined in claim 1 wherein each of said flap portions is integrally hinged to a corresponding one of said side walls and end walls and wherein said relatively rigid lower portion is treated to be liquid resistant.

9. A disposable cat litter box as defined in claim 1 wherein at least one of said flap portions establishes a seal with said relatively rigid lower portion when said at least one flap portion is in said collapsed position.

10. A disposable cat litter box as defined in claim 9 wherein said at least one flap portion is provided with finger pull means.

11. A box construction consisting of a bottom portion including a relatively rigid lower portion having a bottom wall, a pair of integral upstanding side walls and a pair of integral upstanding end walls; and an integral foldable upper portion including a single flap portion foldable between collapsed and extended positions attached to each of said side walls and end walls wherein, in the extended position, vertical edges of each flap portion lie substantially perpendicular to vertical edges of adjacent flap portions, and further wherein each pair of adjacent edges are created from a single cut in said upper portion such that, in said extended position, a friction lock is established between said adjacent edges; said box also consisting of a removable, relatively rigid lid including a top wall and four side walls dimensioned to fit on said bottom portion with said flap portions in either said collapsed or extended positions.

12. A disposable cat litter box as defined in claim 11 and wherein each of said flap portions is in frictional engagement with adjacent flap portions in the extended position.

13. A box construction as defined in claim 11 wherein said removable lid is dimensioned to lie over and substantially completely enclose said relatively rigid lower portion in telescoping relationship, when said flap portions are in the collapsed position, such that the removable lid will engage a supporting surface underlying the box.

14. A two piece cat litter box blank comprising a box bottom lower portion including a first pair of relatively rigid sidewalls, a first pair of relatively rigid end walls and a bottom wall, and a box bottom upper portion comprising foldable flap portions integrally hinged to each of said pair of relatively rigid sidewalls and said pair of relatively rigid end walls; said box bottom formed from a single elongated blank having a first set of three parallel lines defining four panels, each of which forms one of the two pair of end walls and side walls, one of the foldable flap portions, and a portion of said bottom wall wherein one of said foldable flap portions is provided with a die cut opening for permitting a cat to enter and exit the box; and wherein each of said three parallel lines comprises an upper slit portion extending between adjacent foldable flap portions; an intermediate fold portion extending between adjacent end or side walls; and a lower notched portion extending between adjacent bottom wall portions, said upper slit portions being formed without tolerance so that, in use, a friction lock is established between said foldable flap portions when said foldable flap portions are raised to an upright position.

15. A two piece cat litter box blank as defined in claim 14 and further comprising a separable lid blank including a second pair of relatively rigid end walls, a second pair of relatively rigid end walls, and a top wall, said separable lid formed from a single blank of material having two parallel side edges and two parallel end edges, and fold lines extending adjacent and parallel to each of said side and end edges.

16. A two piece cat litter box blank as defined in claim 14 wherein said blank has a second set of two fold lines extending substantially perpendicular to said first set of three parallel lines, said second set of fold lines extending between said foldable flap portions and said bottom wall portions.

17. A two piece cat litter box blank as defined in claim 16 wherein said second set of fold lines define therebetween said two pair of relatively rigid end walls and side walls.

18. A two piece cat litter box blank as defined in claim 17 and further comprising a separable lid blank including a second pair of relatively rigid side walls, a second pair of relatively rigid end walls, and a top wall, said separable lid formed from a single blank material having two parallel side edges and two parallel end edges, and fold lines extending adjacent and parallel each of said side and end edges.

19. A two piece cat litter box blank as defined in claim 14 wherein the bottom wall portion of each of said panels, in the use, collectively form a double layer bottom wall.

20. A two piece cat litter box blank as defined in claim 18 wherein the bottom wall portion of each of said collectively form a double thickness bottom wall.

21. A two piece cat litter box blank as defined in claim 14 wherein another of said foldable flap portions is dimensioned to establish a seal with said box bottom lower portion when said another of said foldable flap portions is in a collapsed or folded position.

22. A two piece cat litter box blank as defined in claim 21 wherein said another of said foldable flap portions is provided with integral finger pull means.

23. A prepackaged cat litter box comprising a bottom portion carrying a predetermined amount of litter material, said bottom portion including a relatively rigid lower portion having a bottom wall, a pair of upstanding side walls and a pair of upstanding end walls, and flap portions attached to each of said side walls and end walls, said flap portions being folded to an initial collapsed position;

and a removable, relatively rigid lid applied to and substantially completely enclosing said bottom portion;

wherein, in use, said flap portions are foldable to an upright position such that edges of each flap portion lie substantially perpendicular to vertical edges of adjacent flap portions, and further wherein each pair of adjacent edges are created from a single cut in said upper portion such that, in said upright position, a friction lock is established between said adjacent edges, said removable lid adapted to fit over said flap portions in said upright position; and further wherein, for disposal purposes, said flap portions are foldable to their initial collapsed position and said lid is replaceable to substantially fully enclose said bottom portion, so that a consumer need not come into contact with the litter material at any time from purchase to disposal of the box.

24. A two piece box blank comprising a box bottom lower portion including a first pair of relatively rigid sidewalls, a first pair of relatively rigid end walls and a bottom wall, and a box bottom upper portion comprising foldable flap portions integrally hinged to each of said pair of relatively rigid sidewalls and said pair of relatively rigid end walls; said box bottom formed from a single elongated blank having a first set of three parallel lines defining four panels, each of which forms one of the two pair of end walls and side walls, one of the foldable flap portions, and a portion of said bottom wall wherein each of said three parallel lines comprises an upper slit portion extending between adjacent foldable flap portions; an intermediate fold portion extending between adjacent end or side walls; and a lower notched portion extending between adjacent bottom wall portions, said upper slit portions being formed without tolerance so that, in use, a friction lock is established between said foldable flap portions when said foldable flap portions are raised to an upright position.

* * * * *